(12) United States Patent
Tauscher et al.

(10) Patent No.: US 8,218,014 B2
(45) Date of Patent: Jul. 10, 2012

(54) ELECTROMAGNETIC SCANNER HAVING VARIABLE COIL WIDTH

(75) Inventors: Jason B. Tauscher, Sammamish, WA (US); Dean R. Brown, Lynnwood, WA (US); Matthew Ellis, Austin, TX (US); Wyatt O. Davis, Bothell, WA (US); Mark P. Helsel, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 477 days.

(21) Appl. No.: 12/512,261

(22) Filed: Jul. 30, 2009

(65) Prior Publication Data

US 2011/0026549 A1 Feb. 3, 2011

(51) Int. Cl.
*H04N 3/08* (2006.01)

(52) U.S. Cl. ............... 348/203; 348/90; 348/96; 348/98; 348/195; 348/206; 348/202; 348/264; 348/792; 348/744; 372/38.02; 359/196.1; 359/198; 359/199; 359/848; 359/871; 358/408

(58) Field of Classification Search ............... 348/203, 348/90, 96, 98, 195, 206, 202, 264, 792; 348/744; 372/38.02; 359/196.1, 198, 199, 359/848, 871; 358/408
See application file for complete search history.

(56) References Cited

U.S. PATENT DOCUMENTS

| | | | | |
|---|---|---|---|---|
| 4,143,403 A * | 3/1979 | Ohnishi | ........................ | 348/203 |
| 4,268,871 A * | 5/1981 | Kawamura | ..................... | 347/251 |
| 4,599,005 A * | 7/1986 | Kawamura et al. | ........... | 368/157 |
| 5,363,232 A * | 11/1994 | Tokue | .......................... | 359/234 |
| 5,952,787 A * | 9/1999 | Jang | ................................ | 315/8 |
| 6,091,461 A * | 7/2000 | Bardmesser | ................... | 348/744 |
| 6,788,354 B2 * | 9/2004 | Russ et al. | ..................... | 348/745 |
| 7,499,070 B2 * | 3/2009 | Horie et al. | ..................... | 347/235 |
| 7,786,450 B2 * | 8/2010 | Zach et al. | ............. | 250/396 ML |
| 2003/0021497 A1* | 1/2003 | Kandori et al. | ............... | 382/323 |
| 2005/0185235 A1* | 8/2005 | Cannon et al. | ................ | 359/204 |
| 2006/0164709 A1* | 7/2006 | Tomita et al. | .................. | 359/205 |

\* cited by examiner

*Primary Examiner* — Jefferey Harold
*Assistant Examiner* — Mustafizur Rahman
(74) *Attorney, Agent, or Firm* — Kevin D. Wills (57) ABSTRACT

Briefly, in accordance with one or more embodiments, a scanner for a scanned beam display may comprise a scanning platform having a mirror disposed thereon to reflect a beam of light impinging on the mirror, a drive coil disposed on the scanning platform to scan the reflected beam of light in response to a drive current applied to the drive coil. The drive coil has coil winding segments having a narrower width in one or more regions of the drive coil, and has coil winding segments having a greater width in one or more other regions of the drive coil to provide a the drive coil with a reduced electrical resistance.

11 Claims, 6 Drawing Sheets

ELECTROMAGNETIC SCANNER HAVING VARIABLE COIL WIDTH

BACKGROUND

Scanned laser displays typically utilize a microelectromechanical system (MEMS) based electromagnetically driven actuator to drive a scanning platform having a mirror disposed on the scanning platform to reflect the laser beam in one or multiple dimensions. Such electromagnetically driven actuators operate by having a current carrying conductor in a coil arrangement interact with the magnetic field of a permanent magnet or electromagnet to generate torque that moves the scan platform. The resistance of the current carrying conductor may significantly affect the power consumption of the actuator. In general, lower resistance may result in lower power consumption by the actuator. In a conventional motor design, the cross section of the conductor is typically constant and determined by the gage of the wire used to wind the motor coil. In a MEMS type actuator, the cross section of the conductor may affect the coil resistance.

Coil resistance may be reduced by reducing the number of turns in the actuator coil. However with fewer turns the drive current requirement is greater to obtain the same amount of torque produced by the actuator. Increasing the drive current also produces increased joule heating which decreases the efficiency of the actuator.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
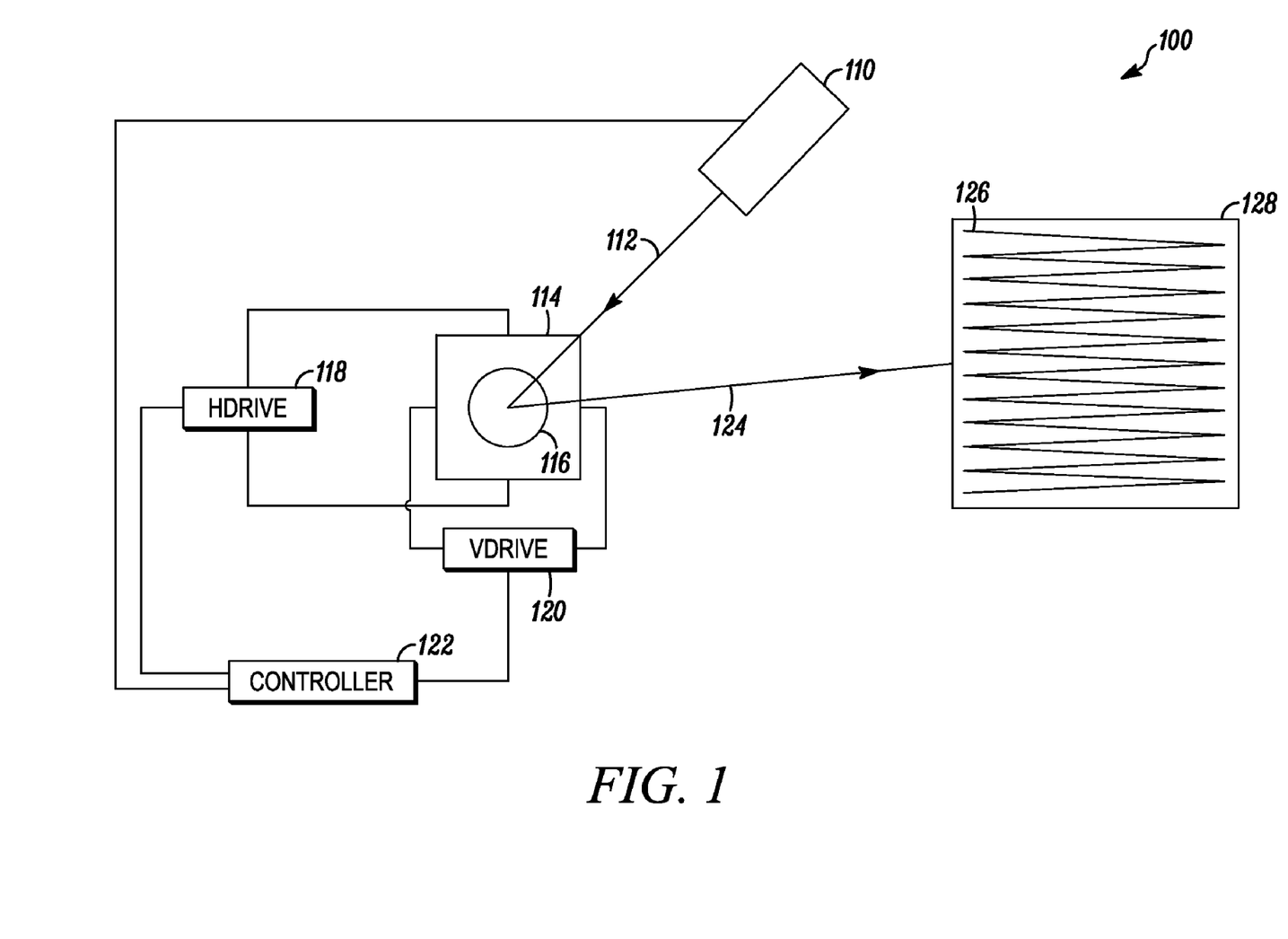
FIG. 1 is a diagram of a scanned laser display in accordance with one or more embodiments.

Referring now to FIG. 1, a diagram of a scanned laser display in accordance with one or more embodiments will be discussed. Although FIG. 1 illustrates one type of a scanned beam display system for purposes of discussion, for example a microelectromechanical system (MEMS) based display, it should be noted that other types of displays may be utilized such as a liquid crystal display (LCD), liquid crystal on silicon (LCOS) display, or a digital light projector (DLP), as one of many examples, and the scope of the claimed subject matter is not limited in this respect.

As shown in FIG. 1, scanned beam display 100 comprises a light source 110, which may be a laser light source such as a laser or the like, capable of emitting a beam 112 which may comprise a laser beam. In some embodiments, light source may comprise two or more light sources, such as in a color system having red, green, and blue light sources, wherein the beams from the light sources may be combined into a single beam. The beam 112 impinges on a scanning platform 114 which may comprise a microelectromechanical system (MEMS) based scanner or the like in one or more embodiments, and reflects off of scanning mirror 116 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning devices. A horizontal drive circuit 118 and/or a vertical drive circuit 120 modulate the direction in which scanning mirror 116 is deflected to cause output beam 124 to generate a raster scan 126, thereby creating a displayed image 128, for example on a projection surface and/or image plane. A display controller 122 controls horizontal drive circuit 118 and vertical drive circuit 120 by converting pixel information of the displayed image into laser modulation synchronous to the scanning platform 114 to write the image information as displayed image 128 based upon the position of the output beam 124 in raster pattern 126 and the corresponding intensity and/or color information at the corresponding pixel in the image. Display controller 122 may also control other various functions of scanned beam display 100.

In one or more embodiments, for two dimensional scanning to generate a two dimensional image, a first scan axis may refer to the horizontal direction of raster scan 126 and a second scan axis may refer to the vertical direction of raster scan 126. In some embodiments, scanning mirror 116 may sweep the output beam 124 horizontally at a relatively higher frequency and also vertically at a relatively lower frequency. The result is a scanned trajectory of laser beam 124 to result in raster scan 126. However, the scope of the claimed subject matter is not limited in these respects.

Figure 2:
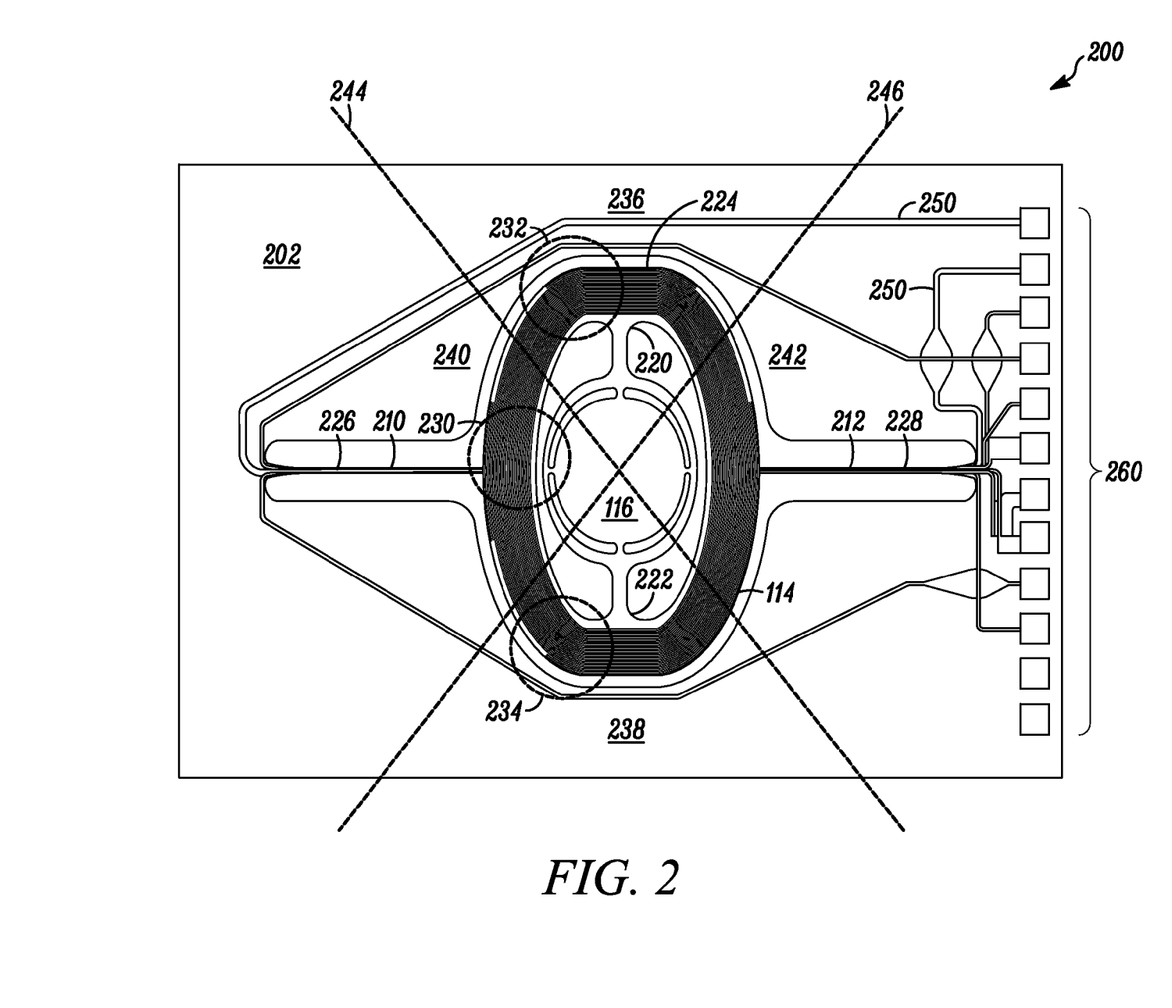
FIG. 2 is a plan view of a microelectromechanical system (MEMS) device with a scanning platform and scanning mirror in accordance with one or more embodiments.

Referring now to FIG. 2, a plan view of a microelectromechanical system (MEMS) device with a scanning platform and scanning mirror in accordance with one or more embodiments will be discussed. MEMS device 200 includes fixed platform 202, scanning platform 114 and scanning mirror 116. Scanning platform 114 is coupled to fixed platform 202 by flexures 210 and 212, and scanning mirror 116 is coupled to scanning platform 114 by flexures 220 and 222. Scanning platform 114 has a drive coil 224 connected to drive lines 250 to provide a coil input 226 and a coil output 228 for the windings of coil 224. Current applied to drive lines 250 produces a current in the drive coil 224. MEMS device 200 also may incorporate one or more integrated piezoresistive position sensors (not shown). In some embodiments, MEMS device 200 includes one position sensor for each axis wherein a first axis is generally coincident with flexures 210 and 212, and a second axis is generally coincident with flexures 220 and 222. Certain interconnects 260 are coupled to drive lines 250 for receiving a drive current as an input signal to drive coil 224. Other interconnects 260 may be coupled to the integrated position sensors for each of the axes.

In operation, an external magnetic field source such as a permanent magnet or electromagnet (not shown) imposes a magnetic field on the drive coil 224. The magnetic field imposed on the drive coil 224 by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 114, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

Scanning platform 114 moves relative to fixed platform 202 in response to the torque. Flexures 210 and 220 are torsional members that twist as scanning platform 114 undergoes an angular displacement with respect to fixed platform 202. In some embodiments, scanning mirror 116 moves relative to scanning platform 114 at a resonant frequency, although the scope of the claimed subject matter is not limited in these respects.

The long axis of flexures 210 and 212 form a pivot axis. Flexures 210 and 212 are flexible members that undergo torsion, thereby allowing scanning platform 114 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have a displacement with respect to the other platform.

Flexure 210 includes conductors coupled to drive lines 250 to carry current to the drive coil on platform 114. The drive coil may be made of one or more electrically conductive materials. For example, the drive coil may be made of copper, which is known to have a relatively high electrical conductivity. Also for example, in some embodiments, the drive coil 224 may contain more than one electrically conductive material, such as copper, nickel, silver, and/or gold, in order to provide corrosion resistance and/or to be wire bond compatible, in addition to having high electrical conductivity. Similarly, drive lines 250 on fixed platform 202 may also be copper conductors or the like.

In one or more embodiments, drive coil 224 may be divided into four quadrants 236, 238, 240, and 242 via crossed dotted lines 244 and 246 as shown. The division into the four quadrants generally may be based on the width of the coil windings in the respective quadrants. In quadrant 236 the windings of drive coil 224 may be generally wider, and in quadrant 238 the windings of drive coil 224 may be generally narrower than the wider windings in quadrant 236. Quadrant 240 and quadrant 242 may be referred to as transition sections in which the widths of the windings transition from narrower to wider, or from wider to narrower, between quadrant 236 and quadrant 238. In one or more embodiments as will be discussed in further detail, below, drive coil 224 may have a variable width at certain locations along the windings of drive coil in order to optimize one or more electrical characteristics of drive coil 224. For example, the resistance of drive coil may be reduced or minimized by increasing the width of the windings of the drive coil in certain regions to offset the more narrow width of the windings in locations where the geometry of the scanning platform 114 may involve more narrow windings of drive coil 224. In some embodiments, the resistance of the drive coil may be reduced by increasing the width of the windings of the drive coil 224 at certain locations while also providing selected widths of the windings at certain locations to provide for an overall balance of the mass of drive coil 224. In such embodiments, the electrical characteristics of drive coil 224 may be optimized in combination with the optimization of the mechanical characteristics of the drive coil 224. Selected sections of drive coil 224 are taken at section 230, section 232, and section 234 which are shown and discussed in greater detail in FIG. 4, FIG. 5, and FIG. 6, respectively, below.

Figure 3:
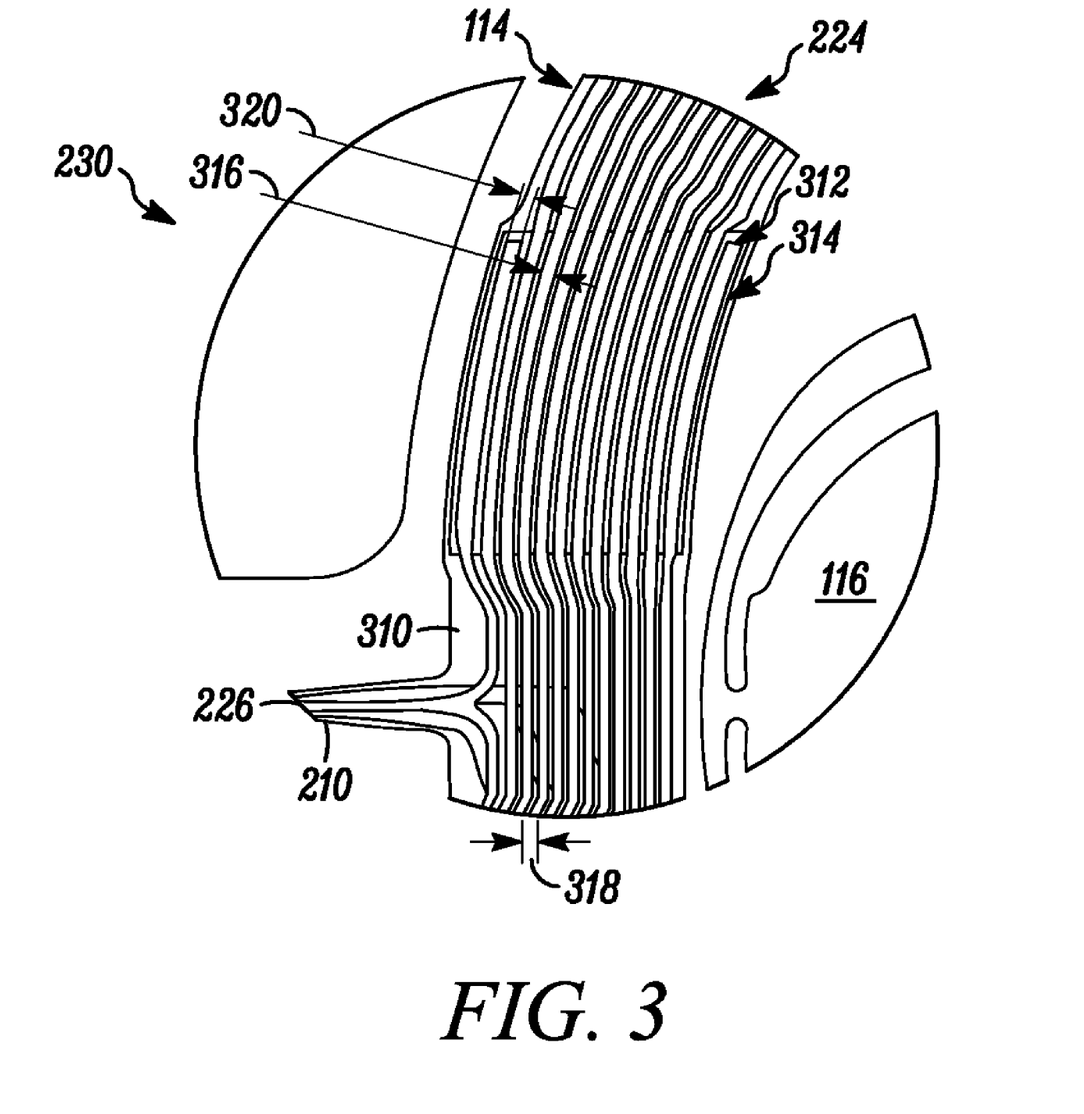
FIG. 3 is an enlarged view of a portion of the drive coil of the scanning platform of FIG. 2 showing a transition region of the drive coil transitioning between narrower coil windings and wider coil windings in accordance with one or more embodiments.

Referring now to FIG. 3, an enlarged detail view of a portion of the drive coil of the scanning platform of FIG. 2 showing a transition region of the drive coil transitioning between narrower coil windings and wider coil windings in accordance with one or more embodiments will be discussed. Section 230 lies in quadrant 240 of drive coil 224 and as such is a transition region wherein the widths of the coil windings of drive coil 224 transition between narrower widths in quadrant 238 and greater widths in quadrant 236. In section 230, flexure 210 couples to scanning platform 114 on which drive coil 224 is disposed including the windings of drive coil 224. In one or more embodiments, scanning platform 114 may be a MEMS based device comprising silicon in which the structural features are formed in a silicon substrate via MEMS fabrication techniques. The windings of drive coil 224 may comprise metal tracings disposed on scanning platform 114 also via MEMS fabrication techniques. The input 226 to drive coil 224 comprise metal tracings that feed into the main portion of drive coil 224 from flexure 210 onto scanning platform 114 which contains windings of drive coil 224. The windings of drive coil 224 wind around scanning platform 114 to form a generally planar coil structure from the outer perimeter of scanning platform 114 and ending at inner coil end 312 where it completes the coil structure at metal coil underpass 314. A typical coil trace width is shown by winding 316. The width of a typical winding 316 in the drive coil 224 is approximately 26 microns. However, due to space limitations in the regions where flexures 210 and 212 couple to the main structure of scanning platform 114, the widths of the coil windings of drive coil 224 are narrower to accommodate coil underpass 314 and metal keep out area 310. The narrower coil windings may have a width of about 10 microns in this particular region, shown in section 230 to accommodate such structures, for example as shown at narrower trace width 318. Once the coil windings clear this transition region, their widths may increase to the typical width of about 26 microns for example as shown at trace width 316. However, the narrower widths of the windings of drive coil 224 having trace width 318 will cause an increase in the overall resistance of drive coil 224. To at least partially offset the increase in the resistance of drive coil 224, the windings may have a wider trace width of about 30 microns at other locations, for example as shown at wider trace width 320, among other locations. The variable trace width of the coil windings of drive coil 224 allows the drive coil 224 to accommodate structural features in the MEMS based scanning platform 114 while also maintaining the overall resistance of drive coil 224 at an optimal value, which in some embodiments may be a minimum value for a given number of turns of drive coil 224. For example, with an otherwise uniform trace width for the windings of drive coil 224, the resistance of drive coil 224 may be about 8 ohms. However, by using a variable trace width for the windings of drive coil 224, wider trace widths may be provided where space in scanning platform 114 may allow for wider trace widths so that the resistance of drive coil may be reduced to about 6 ohms for the same number of coil windings, which results in a lower and/or minimized power consumption for scanning platform 114 and/or for the associated drive electronics.

Furthermore, in addition to optimizing one or more electrical characteristics of drive coil 224, providing a variable trace width for the coil windings of drive coil 224 may also be utilized to optimize one or more physical or mechanical characteristics of drive coil 224 and/or scanning platform 114. For example, as discussed above the trace width of the coil windings may be reduced to accommodate the structural features of scanning platform 114. Furthermore, the trace width of the coil windings may be varied at selected regions in order to mechanically balance the mass of the drive coil 224 and/or the mass of the scanning platform. For example, there may be a partial winding of drive coil 224 on the side of drive coil 224 within quadrant 238 that does not have a corresponding winding on the other side of drive coil within quadrant 236. As a result, with generally equal trace widths of the coil windings in quadrant 236 and 238, the mass of drive coil 224 may be out of inertial balance which could adversely affect the operation of scanning platform 114 since there would be a greater mass of drive coil 224 in quadrant 238 than the mass of drive coil 224 in quadrant 236. Such mass differential may be at least partially corrected by providing a narrower trace width of the coil windings in quadrant 238 while providing a greater width of the coil windings in quadrant 236. Furthermore, this type of mechanical optimization of drive coil 224 by providing variable trace widths may be performed independently of optimizing the electrical characteristics of drive coil 224 by providing a lower coil resistance which likewise may be performed independently, and/or the optimizing of the electrical and mechanical characteristics of drive coil 224 may be performed in combination. The variation in trace width of the coil windings of drive coil 224 is shown in and described in further detail with respect to FIG. 4 and FIG. 5, below.

Figure 4:
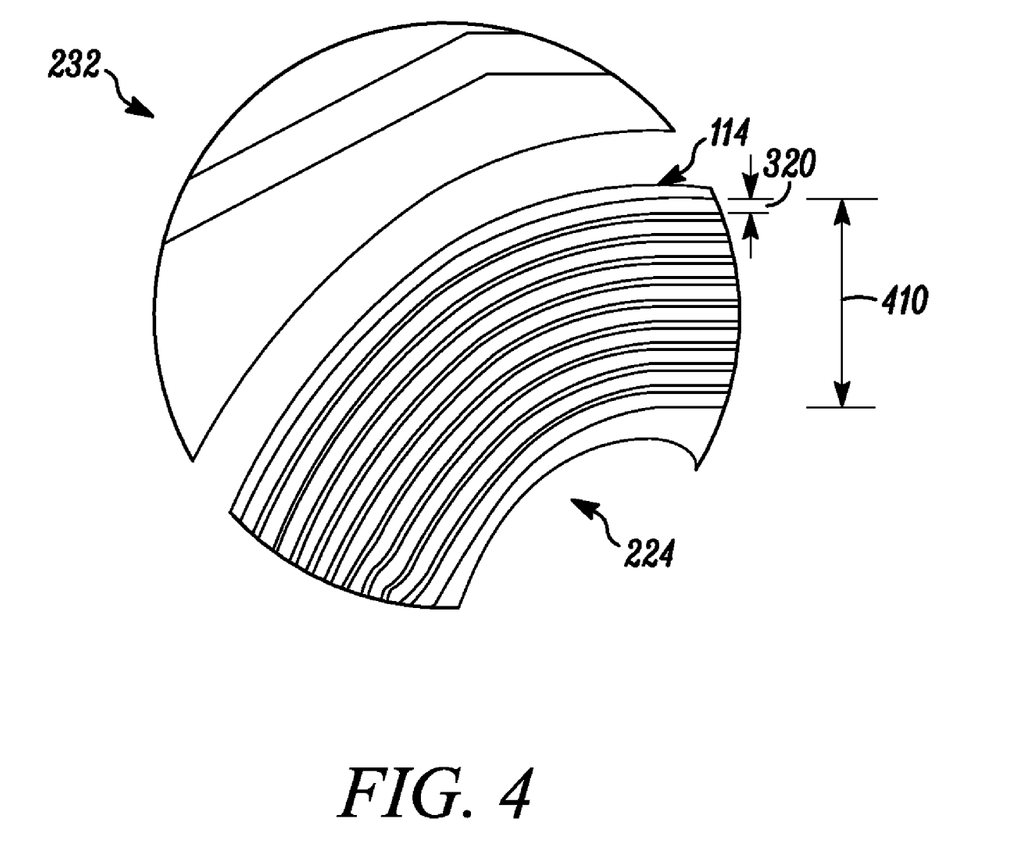
FIG. 4 is an enlarged view of a portion of the drive coil of the scanning platform of FIG. 2 showing a region of wider coil windings in accordance with one or more embodiments.

Referring now to FIG. 4, an enlarged detail view of a portion of the drive coil of the scanning platform of FIG. 2 showing a region of wider coil windings in accordance with one or more embodiments will be discussed. In section 232, scanning platform 114 may have more area to accommodate a wider trace width, for example trace width 320 wherein the windings of drive coil 224 may have a width of about 30 microns. As shown in FIG. 4, in quadrant 236 there may be 10 wider width coil traces distributed across scanning platform 114 in region 410. The wider width coil traces in region 410 and generally in quadrant 236 have a lower electrical resistivity which results in a lower overall electrical resistance for drive coil 224. Furthermore, the wider width coil traces in region 410 and generally in quadrant 236 contain a greater amount of metal and therefore provide a greater mass to drive coil 224 to balance increased mass in quadrant 238 due to the greater number of windings in quadrant 238.

Figure 5:
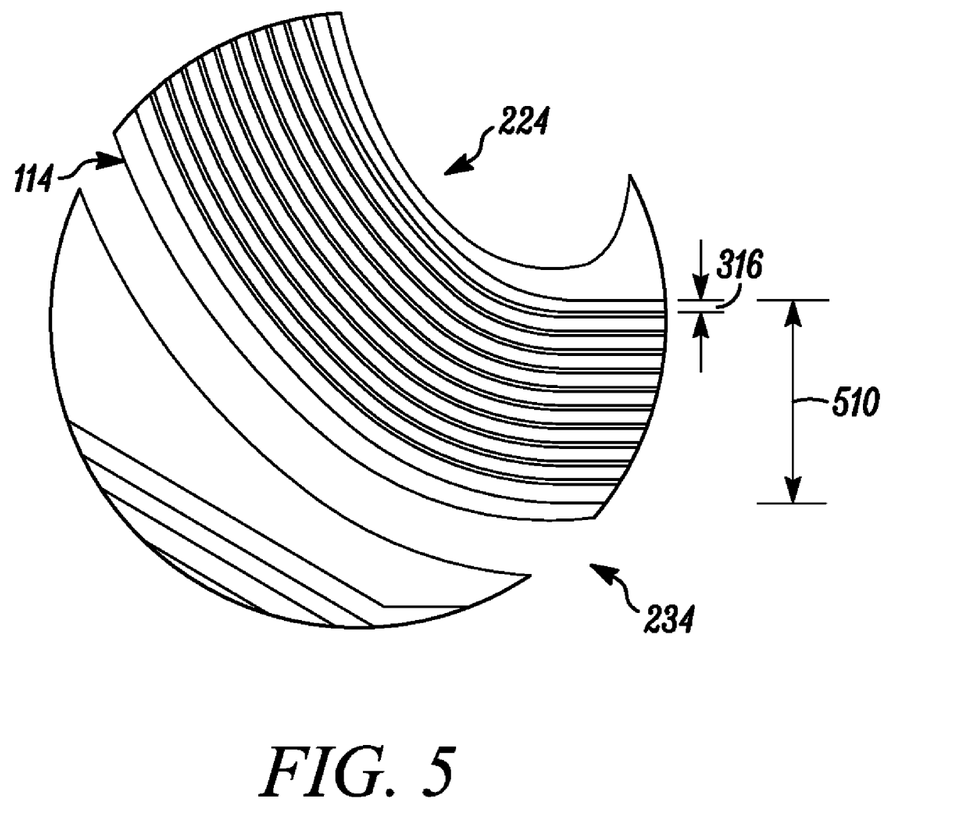
FIG. 5 is an enlarged view of a portion of the drive coil of the scanning platform of FIG. 2 showing a region of narrower coil windings in accordance with one or more embodiments.

Referring now to FIG. 5, an enlarged detail view of a portion of the drive coil of the scanning platform of FIG. 2 showing a region of narrower coil windings in accordance with one or more embodiments will be discussed. In section 234, the windings of coil 224 may have a typical trace width, for example trace width 316 which may be about 26 microns in the portion of scanning platform 114 within quadrant 238 and which is narrower than wider trace width 320 of quadrant 236. Furthermore, there may be 11 coil windings in region 510 within quadrant 236 wherein there may be a partial coil winding that terminates the drive coil at coil end 312. As a result of this partial coil winding, the mass of the drive coil 224 in quadrant 238 would otherwise be greater than the mass of drive coil 224 in quadrant 236 which does not include the partial coil winding. However, as discussed above, this mass imbalance may be at least partially corrected by providing a wider trace width 320 in quadrant 236 with respect to the trace width 316 in quadrant 238 which adds more mass per winding in quadrant 236 than the mass per winding in quadrant 238. For example, the trace width 320 in quadrant 236 may be selected based at least in part on the mass properties of the metal utilized in the coil windings such to provide an additional mass in quadrant 236 that is equal, or nearly equal, to the mass provided by the additional partial winding in quadrant 238 to provide a balanced, or nearly balanced, mass of drive coil 224. Additionally, the wider trace width 320 in quadrant 236 may provide a reduced resistivity that at least partially offsets the increased resistivity of the traces having the narrower trace width 318 in the transition region of quadrant 240 and/or quadrant 242. Furthermore, the wider trace width 320 in quadrant 236 may even more than offset the increased resistivity in other regions from narrower trace widths such that the overall resistance of drive coil 224 is decreased even further than an amount that would offset the effects of the narrow trace widths in the transition regions. It should be noted that the examples provided above including trace width values are for purposes of illustration, and the scope of the claimed subject matter is not limited in these respects.

Figure 6:
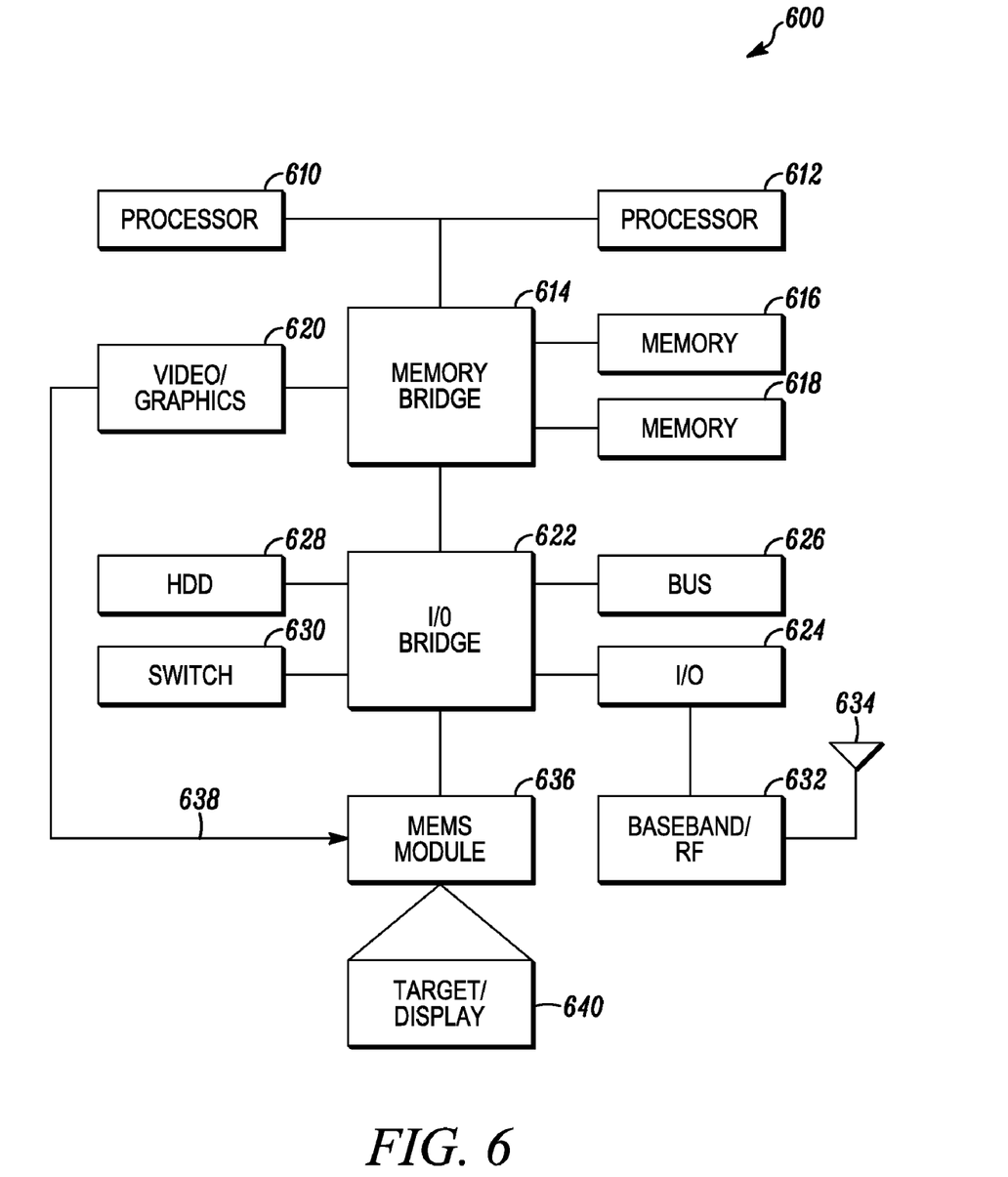
FIG. 6 is a block diagram of an information handling system utilizing a scanned laser display having a variable width drive coil to optimize electrical and/or mechanical characteristics of the drive coil in accordance with one or more embodiments.

Referring now to FIG. 6, a block diagram of an information handling system utilizing a scanned laser display having a variable width drive coil to optimize electrical and/or mechanical characteristics of the drive coil in accordance with one or more embodiments will be discussed. Information handling system 600 of FIG. 6 may tangibly embody scanned laser display 100 as shown in and described with respect to FIG. 1. Although information handling system 600 represents one example of several types of computing platforms, including cell phones, personal digital assistants (PDAs), netbooks, notebooks, internet browsing devices, and so on, information handling system 600 may include more or fewer elements and/or different arrangements of the elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a video/graphics system 620 to drive a display device, which may comprise MEMS module 636, coupled to information handling system 600. In one or more embodiments, video/graphics system 620 may couple to one or more of processors 610 and/or 612 and may be disposed on the same core as the processor 610 and/or 612, although the scope of the claimed subject matter is not limited in this respect.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a baseband and radio-frequency (RF) block 632 comprising a base band processor and/or RF circuits and devices for wireless communication with other wireless communication devices and/or via wireless networks via antenna 634, although the scope of the claimed subject matter is not limited in these respects.

In one or more embodiments, information handling system 600 may include a MEMS module 636 that may correspond to scanning platform 114 of FIG. 1 and/or MEMS device 200 of FIG. 2, and which may include any one or more or all of the components of scanned laser display 100 such as processor 122, horizontal drive circuit 118, vertical drive circuit 120, and/or laser source 110. In one or more embodiments, MEMS module 636 may be controlled by one or more of processors 610 and/or 612 to implements some or all of the functions of controller 122 of FIG. 1. In one or more embodiments, MEMS module 636 may comprise a MEMS based scanned laser display for displaying an image projected by MEMS module 636 where the image may likewise be represented by target/display 640. In one or more embodiments, a scanned beam display engine may comprise video/graphics block 620 having a video controller to provide video information 638 to MEMS module 636 to display an image represented by target/display 640. In one or more embodiments, such a MEMS module 636 may include MEMS device 200 including drive coil 224 having variable width coil windings as described herein. However, these are merely example implementations for MEMS module 636 within information handling system 600, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to an electromagnetic scanner having variable coil width to optimize electrical and/or mechanical characteristics of the coil and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
   a scanning platform having a mirror disposed thereon to reflect a beam of light impinging on the mirror;
   a drive coil disposed on the scanning platform to scan the reflected beam of light in response to a drive current applied to the drive coil; and
   wherein the drive coil has coil windings having a narrower width in one or more regions of the drive coil, and has coil windings having a greater width in one or more other regions of the drive coil to provide the drive coil with a reduced electrical resistance, wherein the drive coil has a first number of coil winding segments on a first side of the drive coil, and the drive coil has a second number of coil winding segments on a second side of the drive coil, the second number being greater than the first number such that there is an increased mass on the second side due to the greater number of coil winding segments, and the coil winding segments on the first side having a greater width than a width of the coil winding segments on the second side such that the there is an increased mass on the first side due to the greater width of the coil winding segments that matches or nearly matches the increased mass on the second side.

2. An apparatus as claimed in claim 1, wherein the coil windings having a narrower width provide an increase in the electrical resistance of the drive coil, and wherein the coil windings having a greater width reduce the electrical resistance of the drive coil in a magnitude that at least partially offsets the increase electrical resistance of the drive coil by the narrower width coil windings.

3. An apparatus as claimed in claim 1, wherein the coil windings having a narrower width provide an increase in the electrical resistance of the drive coil, and wherein the coil windings having a greater width reduce the electrical resistance of the drive coil in a magnitude that exceeds the increase electrical resistance of the drive coil by the narrower width coil windings.

4. A scanned laser display, comprising:
a laser source to provide a laser beam as an output;
a scanning platform having a mirror disposed thereon to reflect the laser beam impinging on the mirror;
a drive coil disposed on the scanning platform to scan the reflected beam of light in response to a drive current applied to the drive coil; and
a controller to control the drive current applied to the drive coil;
wherein the drive coil has coil winding segments having a narrower width in one or more regions of the drive coil, and has coil winding segments having a greater width in one or more other regions of the drive coil to provide the drive coil with a reduced electrical resistance, wherein the drive coil has a first number of coil winding segments on a first side of the drive coil, and the drive coil has a second number of coil winding segments on a second side of the drive coil, the second number being greater than the first number such that there is an increased mass on the second side due to the greater number of coil winding segments, and the coil winding segments on the first side having a greater width than a width of the coil winding segments on the second side such that the there is an increased mass on the first side due to the greater width of the coil winding segments that matches or nearly matches the increased mass on the second side.

5. A scanned laser display as claimed in claim 4, wherein the coil winding segments having a narrower width provide an increase in the electrical resistance of the drive coil, and wherein the coil winding segments having a greater width reduce the electrical resistance of the drive coil in a magnitude that at least partially offsets the increase electrical resistance of the drive coil by the narrower width coil winding segments.

6. A scanned laser display as claimed in claim 4, wherein the coil winding segments having a narrower width provide an increase in the electrical resistance of the drive coil, and wherein the coil winding segments having a greater width reduce the electrical resistance of the drive coil in a magnitude that exceeds the increase electrical resistance of the drive coil by the narrower width coil winding segments.

7. A scanned laser display as claimed in claim 4, wherein the controller controls the laser source and the drive current provided to the scanning platform to generate a scanned beam image displayed on a projection surface.

8. An information handling system, comprising:
a graphics circuit to provide a video image output;
a laser source to provide a laser beam output in response to the video image output;
a scanning platform having a mirror disposed thereon to reflect the laser beam impinging on the mirror;
a drive coil disposed on the scanning platform to scan the reflected beam of light in response to a drive current applied to the drive coil; and
a controller to control the drive current applied to the drive coil in response to the video image output;
wherein the drive coil has coil winding segments having a narrower width in one or more regions of the drive coil, and has coil winding segments having a greater width in one or more other regions of the drive coil to provide the drive coil with a reduced electrical resistance, wherein the drive coil has a first number of coil winding segments on a first side of the drive coil, and the drive coil has a second number of coil winding segments on a second side of the drive coil, the second number being greater than the first number such that there is an increased mass on the second side due to the greater number of coil winding segments, and the coil winding segments on the first side having a greater width than a width of the coil winding segments on the second side such that the there is an increased mass on the first side due to the greater width of the coil winding segments that matches or nearly matches the increased mass on the second side.

9. An information handling system as claimed in claim 8, wherein the coil windings having a narrower width provide an increase in the electrical resistance of the drive coil, and wherein the coil winding segments having a greater width reduce the electrical resistance of the drive coil in a magnitude that at least partially offsets the increase electrical resistance of the drive coil by the narrower width coil winding segments.

10. An information handling system as claimed in claim 8, wherein the coil winding segments having a narrower width provide an increase in the electrical resistance of the drive coil, and wherein the coil winding segments having a greater width reduce the electrical resistance of the drive coil in a magnitude that exceeds the increase electrical resistance of the drive coil by the narrower width coil winding segments.

11. An information handling system as claimed in claim 8, further comprising a processor coupled to the graphics circuit, wherein the processor and the graphics circuit are disposed on common core.

* * * * *